United States Patent
Nguyen et al.

(10) Patent No.: US 7,352,087 B2
(45) Date of Patent: Apr. 1, 2008

(54) POWER SYSTEM CONFIGURATION

(75) Inventors: Don J. Nguyen, Portland, OR (US);
Bruce W. Rose, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 10/750,568

(22) Filed: Dec. 31, 2003

(65) Prior Publication Data

US 2005/0146816 A1 Jul. 7, 2005

(51) Int. Cl.
*H02J 7/04* (2006.01)
*H02J 9/06* (2006.01)

(52) U.S. Cl. .......................... 307/150; 307/64; 307/66

(58) Field of Classification Search ................. 307/64, 307/150
See application file for complete search history.

(56) References Cited

U.S. PATENT DOCUMENTS

| | | | | |
|---|---|---|---|---|
| 4,673,826 A | * | 6/1987 | Masson | 307/66 |
| 5,510,659 A | * | 4/1996 | Lewis et al. | 307/11 |
| 5,789,098 A | * | 8/1998 | Pinder | 429/61 |
| 5,955,797 A | * | 9/1999 | Kim | 307/150 |
| 6,072,250 A | * | 6/2000 | Thandiwe et al. | 307/150 |
| 6,348,744 B1 | * | 2/2002 | Levesque | 307/86 |
| 6,384,570 B2 | * | 5/2002 | Matsuyama | 320/101 |
| 6,573,621 B2 | * | 6/2003 | Neumann | 307/150 |
| 6,650,089 B1 | * | 11/2003 | Freeman et al. | 320/132 |
| 6,683,439 B2 | * | 1/2004 | Takano et al. | 320/132 |
| 7,019,420 B2 | * | 3/2006 | Kogan et al. | 307/150 |
| 7,030,517 B2 | * | 4/2006 | Hansmann et al. | 307/150 |
| 7,057,309 B2 | * | 6/2006 | Odaohhara | 307/80 |

OTHER PUBLICATIONS

U.S. Appl. No. 11/019,920, filed Dec. 21, 2004, Altenburg et al.

* cited by examiner

*Primary Examiner*—Michael Sherry
*Assistant Examiner*—Hal I. Kaplan
(74) *Attorney, Agent, or Firm*—Robert A. Diehl

(57) ABSTRACT

A power system includes an input power port, a power rail, a battery unit, and a system charger voltage regulator (VR). The system charger VR couples the input power port to the battery unit. The battery unit couples with the system charger VR and the power rail.

2 Claims, 12 Drawing Sheets

POWER SYSTEM CONFIGURATION

FIELD OF THE INVENTION

The present invention relates to the field of power systems. More specifically, the present invention relates to a power system configuration.

BACKGROUND

Many electronic devices can be powered by more than one power source. For example, mobile devices, like notebook computers, can usually be plugged into an AC electric outlet or operated on battery power. These kinds of electronic devices usually include some sort of power system to select from among the available power sources.

FIG. 1 illustrates one example of a typical power system that may be found in any number of electronic devices, such as a notebook computer. An external AC power source 115 is optional. That is, the device may or may not be plugged into an electric outlet at any particular time. An AC/DC converter 110 can convert the AC power (if it is available) to an unregulated, or loosely regulated, DC voltage 180. The DC voltage 180 is unregulated, or loosely regulated, in that converter 110 may not actively control the voltage. Instead, converter 110 may be a passive filter or transformer.

Any number of devices can be used for converter 110. The most familiar kinds of AC/DC converters are rather large blocks that are part of a power cord or power plug. A typical unregulated voltage for a notebook computer is about 20 volts.

The power system also includes two additional power sources, battery pack 140 and battery pack 150. Battery packs 140 and 150 each provide a battery voltage 190. Any number of battery pack designs can be used. A typical battery pack for a notebook computer may include six battery cells coupled in two parallel groups of three cells in series. The safe voltage range for an individual lithium cell is often about 3 to 4.2 volts. That is, a fully charged lithium battery cell will typically provide about 4.2 volts, and the voltage will fall off to about 3 volts as the battery discharges. With three lithium cells in series, a battery pack will often provide a safe voltage range of about 9 to 12.6 volts. Other power systems may include more battery packs or just one battery pack. Other typical battery packs may include different combinations or configurations of battery cells. And, other battery cell chemistries can be used and can provide different voltage ranges.

Source selector 160 selects from among the available power sources based on switch control signal 107. That is, either the unregulated voltage 180 or the battery voltage 190 from one or both of the battery packs can be coupled to the power rail 170 at any particular time. In which case, for a typical notebook computer, the rail voltage 195 can range from about 9 to 20 volts. Power rail 170 can supply power to a wide variety of components and circuits within the electronic device (not shown).

The illustrated example also includes a battery charger 120 and a charging selector 130. Charger 120 can generate a battery voltage 190 from the unregulated voltage 180 (if available). Charging selector 130 can supply the battery voltage 190 to recharge either battery pack 140 or battery pack 150 based on switch control signal 105.

The switch control signals 105 and 107 can come from any number of sources. For example, in a notebook computer, an operating system may generate the control signals. Whatever the source is for the control signals, it may detect when AC power is available, as well as monitor the power levels of the battery packs, to generate the appropriate control signals. Any number of approaches can be used to select which battery to recharge and which power source to use at any given time.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Figure 1:
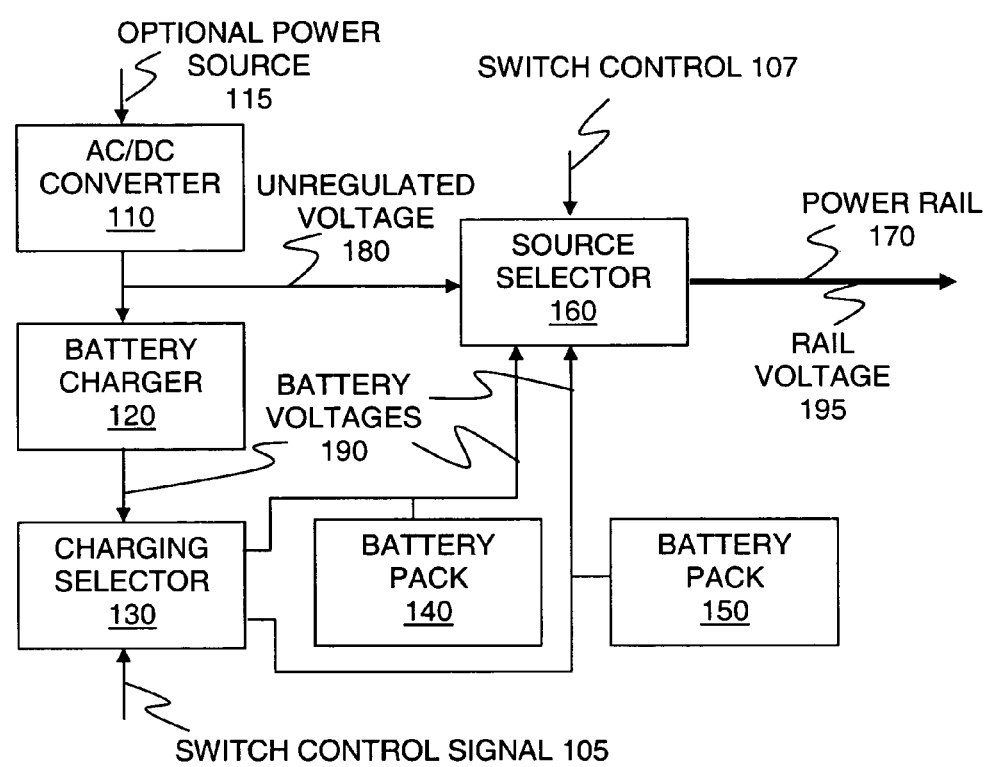
FIG. 1 illustrates a typical power system configuration.

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Two related inventions are described herein. Embodiments of the first invention include novel power system configurations that can provide a variety of advantages over prior power systems. Embodiments of the second invention include novel battery pack configurations. Embodiments of the second invention can be used in concert with a variety of power systems, including embodiments of the first invention.

Although the present inventions are primarily described below in the context of a notebook computer, embodiments of the present inventions can be used in a variety of electronic devices such as video cameras, hand-held computing devices, cellular phones, computer tablets, etc.

FIGS. 2 through 6 illustrate various embodiments of the first invention, the power system configuration. Rather than supplying either an unregulated voltage or a battery voltage to power an electronic device, the illustrated embodiments use the same regulated voltage for recharging batteries to also power the electronic device. For example, as discussed in the background, a typical power system for a notebook computer may provide 9 to 20 volts. By using a regulated voltage to both power an electronic device and recharge its batteries, embodiments of the present invention can reduce that voltage range. In the case of the example notebook computer, the voltage range may be reduced to 9 to 12.6 volts, or whatever the equivalent of the battery voltage range happens to be. Reducing the voltage range can substantially simplify and reduce the cost of many circuits and components within a typical electronic device.

Figure 2:
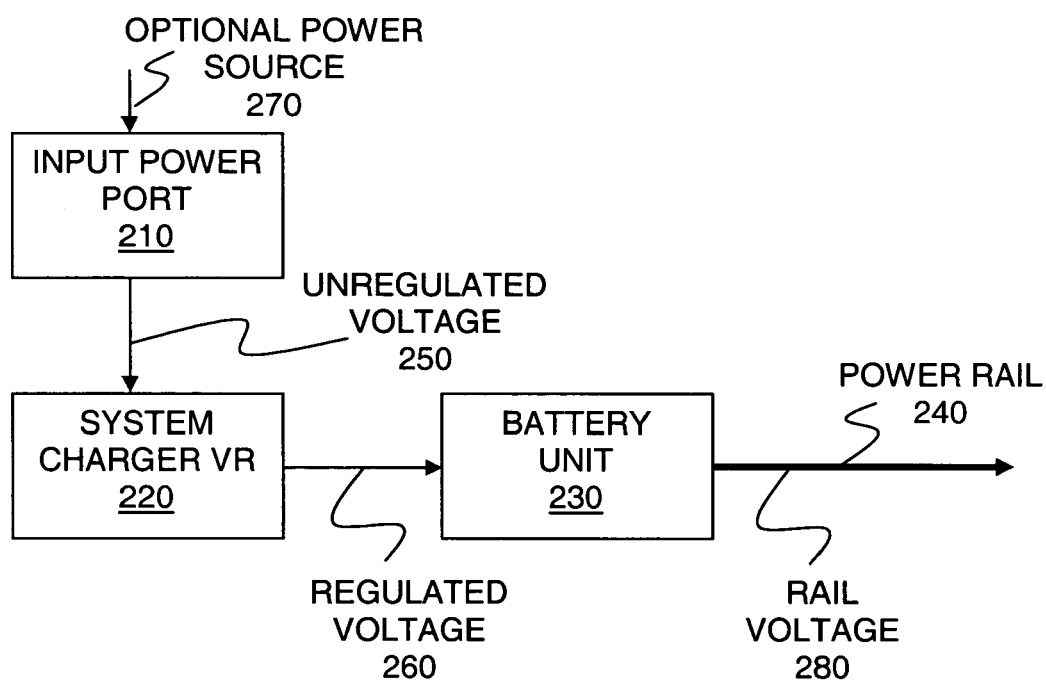
FIGS. 2-6 illustrate various embodiments of a novel power system configuration.

FIG. 2 illustrates one embodiment of the novel power system configuration at a high level. An input power port 210 can be coupled to a power source 270. The power source is optional in that it may or may not be coupled to the input power port at any particular time. Power source 270 and input power port 210 are intended to represent any of a wide variety of such devices. For example, power source 270 could be an AC power outlet or an AC generator, and port 210 could be an AC/DC converter. On the other hand, power source 270 could be any of a wide variety of DC power sources, such as a solar panel, a fuel cell, or power over a local area network (LAN). In which case, power port 210 may simply be a connector between the power source 270 and the rest of the power system.

In any case, an unregulated voltage 250 can be supplied to a system charger voltage regulator (VR) 220. VR 220 can provide a regulated voltage 260 when the unregulated voltage 250 is available. Regulated voltage 260 can be supplied to battery unit 230. Battery unit 230 is coupled to power rail 240. Either the regulated voltage 260 or a battery voltage (not shown) from battery unit 230 can be provided on the power rail 240 as rail voltage 280. In other words, regulated voltage 260 can be used to power the power rail 240 and/or power the battery unit 230 to recharge a battery. The range of regulated voltage 260 can be equal to the range of the battery voltage provided by battery unit 230. For example, the bounds of the voltage range could be 9 to 12.6 volts for both the regulated voltage 240 and the battery voltage. Any number of circuits that can satisfy the requisite power needs can be used for system charger VR 220.

Figure 3:
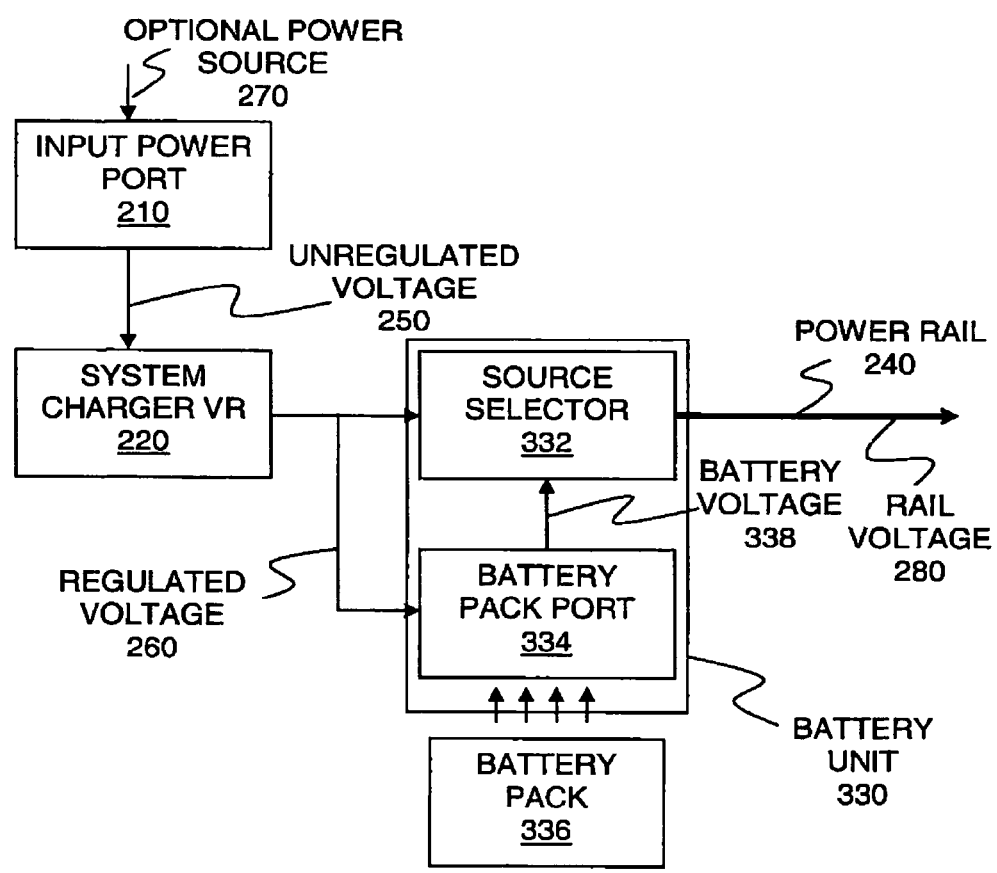

FIG. 3 illustrates another embodiment of the novel power system configuration with a single battery and a source selector. Many of the components in FIG. 3 can be the same as those described in FIG. 2 with the exception of battery unit 330. Battery unit 330 includes a source selector 332 and a battery pack port 334. Battery pack port 334 can receive a removable battery pack 336. In other embodiments, the battery pack may not be removable.

When a battery pack 336 is coupled to port 334, and the battery pack is adequately charged, port 334 can provide a battery voltage 338 to source selector 332. Source selector 332 can select between the regulated voltage 260 and the battery voltage 338 in any number of ways. For example, as described above in FIG. 1, the selection may be based on a control signal.

Regulated voltage 260 is supplied to both source selector 332 and battery pack port 334 in FIG. 3. In which case, the regulated voltage can simultaneously power the power rail 240 and recharge a discharged battery pack 336.

Figure 4:
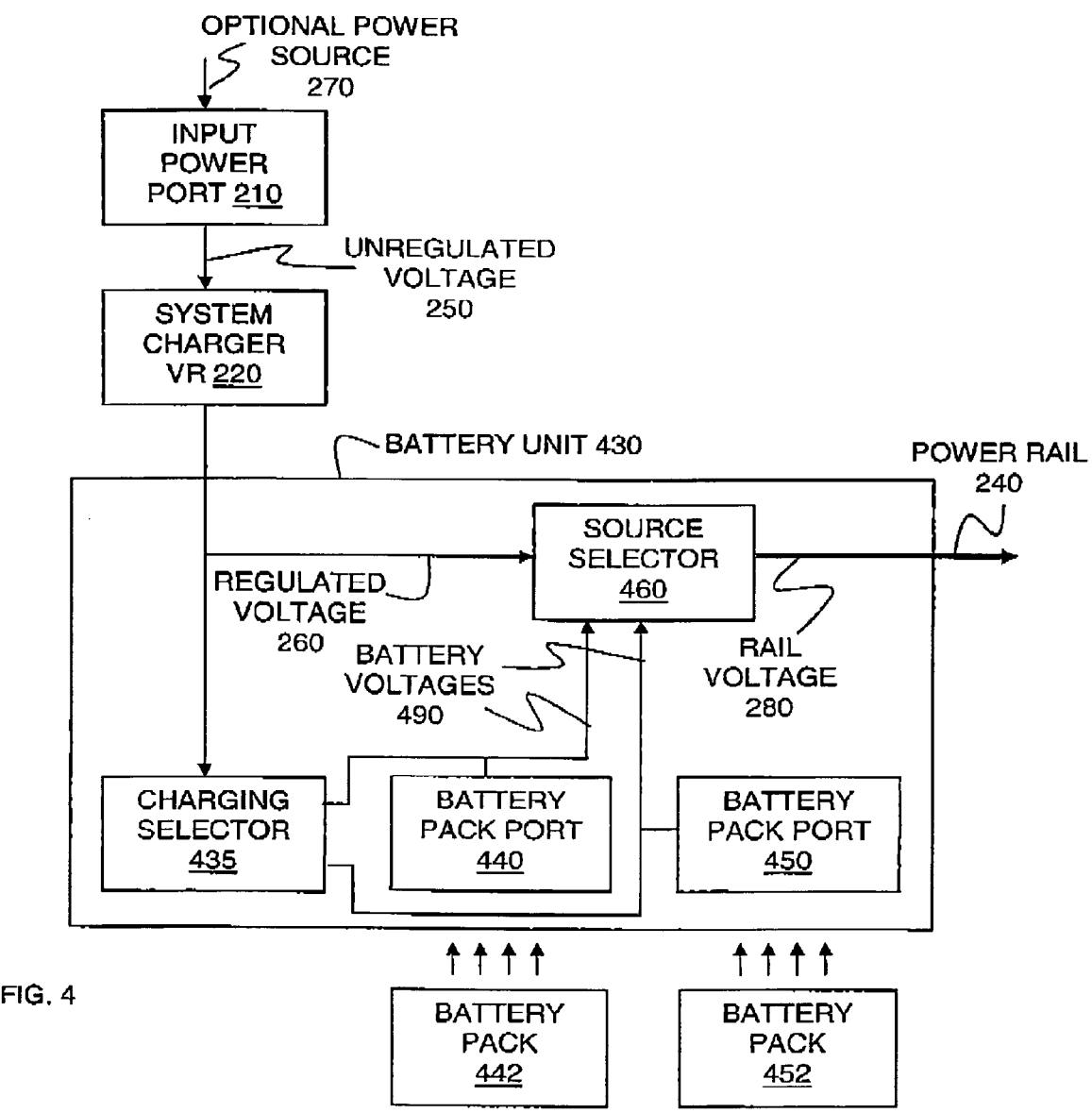

FIG. 4 illustrates another embodiment of the novel power system configuration with multiple batteries and a source selector. Many of the components can be the same as those described in FIG. 2 with the exception of battery unit 430. Battery unit 430 includes a source selector 460, a charging selector 435, and two battery pack ports 440 and 450.

The battery pack ports 440 and 450 can receive removable battery packs 442 and 452. At any particular time, one or both of the battery pack ports may not have a battery pack installed. In other embodiments, one or both of the battery packs may not be removable. Other embodiments may include three or more battery pack ports and battery packs.

Source selector 460 can select from among the regulated voltage 260 and a battery voltage 490 from any one of the battery pack ports 440 and 450 to provide on power rail 240. Charging selector 435 can supply the regulated voltage 260 to the battery pack ports 440 and 450 to recharge a discharged battery pack. Any number of approaches can be used to select none, one, or many of the battery packs for recharging. For example, as described above in FIG. 1, the selection may be based on a control signal.

Figure 5:
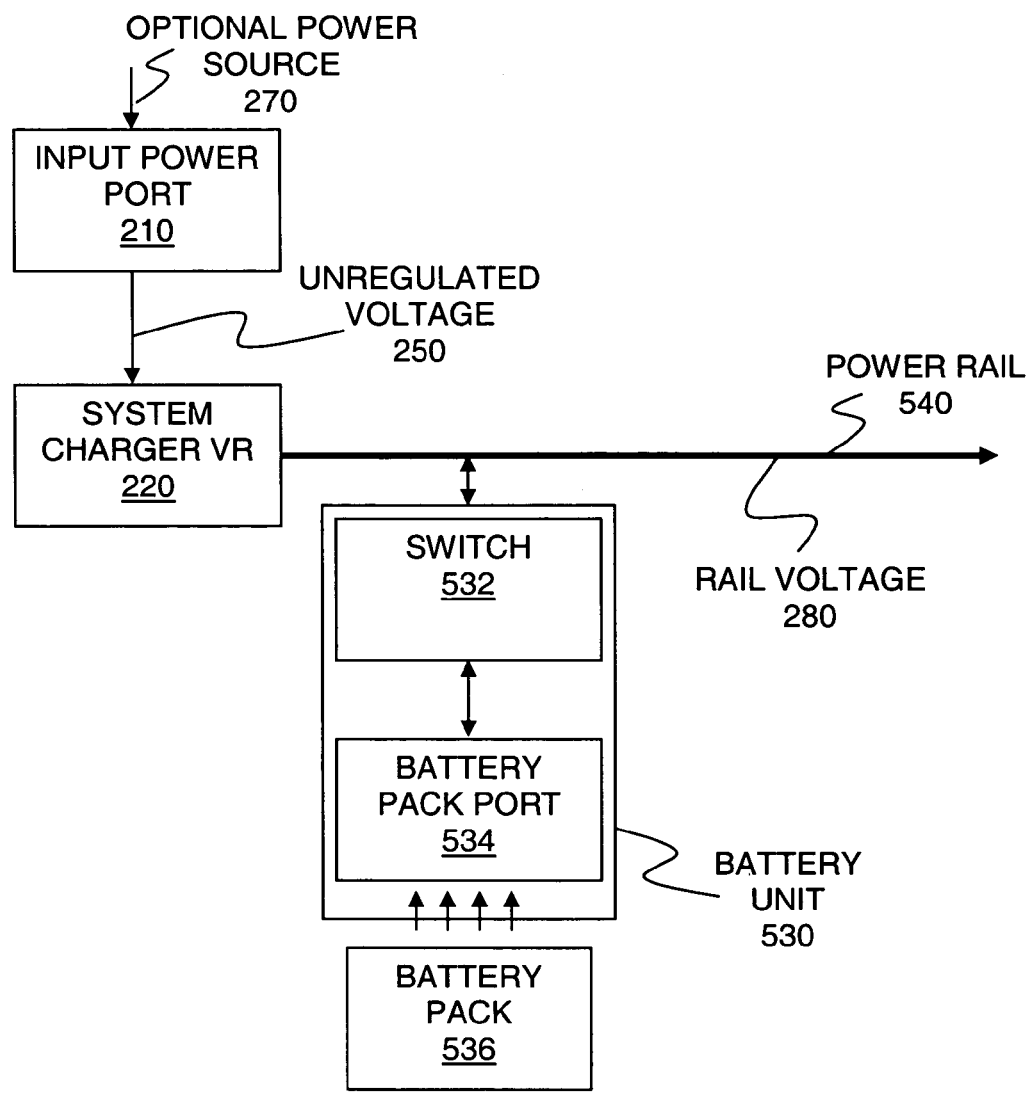

FIG. 5 illustrates another embodiment of the novel power system configuration with a common power rail and a switched battery unit. Input power port 210 and system charger VR 220 can be the same as described in FIG. 2. Power rail 540, however, is coupled directly to system charger VR 220. Battery unit 530 is coupled to VR 220 through power rail 540. Battery unit 530 includes a switch 532 and a battery pack port 534. Battery pack port 534 can receive a removable battery pack 536. In other embodiments, battery pack 536 may not be removable.

If power source 270 is coupled to input power port 210, system charger VR 220 can provide a regulated voltage on power rail 540. If there is a battery pack in battery unit 530, and the battery pack is discharged, switch 532 can couple battery pack port 534 to power rail 540 to recharge the battery. In other words, system charger VR 220 can power both battery unit 530 and power rail 540 simultaneously with one regulated voltage, rail voltage 280.

If power source 270 is not available, there is a battery pack in battery unit 530, and the battery is not completely discharged, switch 532 can couple battery pack port 534 to power the power rail 540 with a battery voltage. Any number of approaches can be used to control switch 532, such as the control signals described above in FIG. 1. Other embodiments may include battery pack ports and switches for two or more battery packs.

Figure 6:
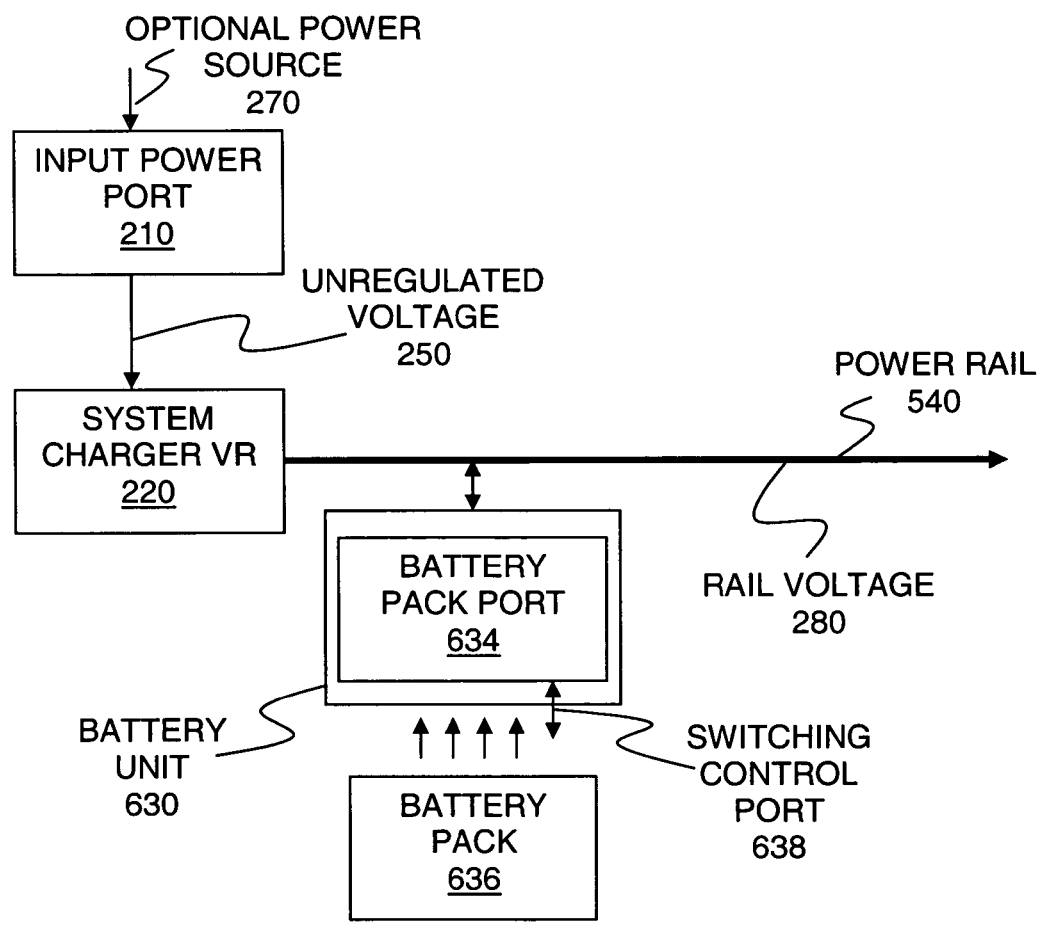

FIG. 6 illustrates another embodiment of the novel power system configuration using one embodiment of the novel battery pack configuration. The illustrated embodiment is similar to the one shown in FIG. 5 except that battery unit 630 does not include switch 532. Instead, the battery pack port 634 in battery unit 630 includes a switching control port 638 to supply switching control signals to a battery pack 636. In other words, the switching function is performed within the battery pack 636 based on control signals from the battery pack port. The switching function may be the same as the function described above for switch 532. That is, the battery pack may connect itself to the power rail 540 to either recharge itself or power the power rail. Any number of approaches can be used to generate the control signals.

Figure 7:
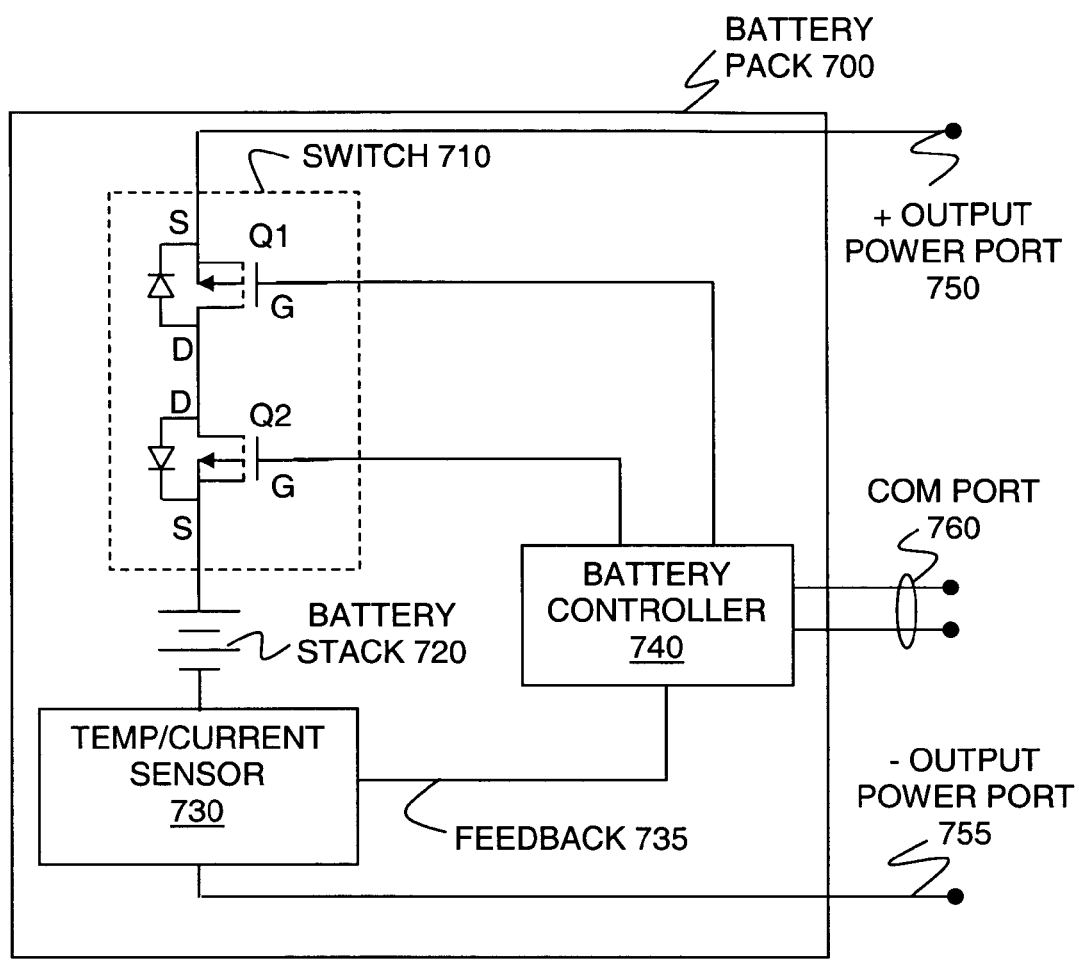
FIG. 7 illustrates a typical battery pack configuration.

FIG. 7 illustrates an example of a typical battery pack 700 that could be used in a wide variety of electronic devices, such as a notebook computer. The illustrated example could also be used with certain embodiments of the novel power system described above, such as the embodiments of FIGS. 3, 4, and 5 in which the power system includes a source selector or battery unit switch.

Some types of battery cells can be dangerous if they are over-charged or discharged too much. These battery cells can leak corrosive chemicals, generate dangerously high temperatures, or even explode. In which case, battery packs for electronic devices often include some form of protection circuitry.

For example, as shown in FIG. 7, in addition to a battery stack 720, battery pack 700 includes a switch 710, a sensor 730, and a battery controller 740. The sensor 730 can sense the temperature and current level of battery stack 720. Other embodiments may not sense temperature, may sense voltage instead of or in addition to current, and may sense any of a number of other battery characteristics.

Feedback 735 from sensor 730 is provided to battery controller 740. Based on the feedback, controller 740 can open the switch 710 before a dangerous condition develops. Opening switch 710 breaks the circuit between the power ports 750 and 755, preventing further charging or discharging of the battery stack 720.

Any number of switch circuits can be used for switch 710. In the illustrated embodiment, switch 710 comprises back-to-back metal-oxide-semiconductor field effect transistors (MOSFETs), Q1 and Q2. The source S of Q1 is coupled to the positive output power port 750. The drain D of Q1 is coupled to the drain D of Q2. The source S of Q2 is coupled to the battery stack 720. The gates G of Q1 and Q2 are coupled to the output of battery controller 740. In other embodiments, the switch can be placed anywhere in the circuit between the positive output power port 750 and the negative output power port 755.

Battery controller 740 may also generate various battery status signals or otherwise communicate with an external system through communication port 760. For example, a standard called the System Management (SM) Bus Protocol defines various types of communication between a battery pack and an external system.

Figure 8:
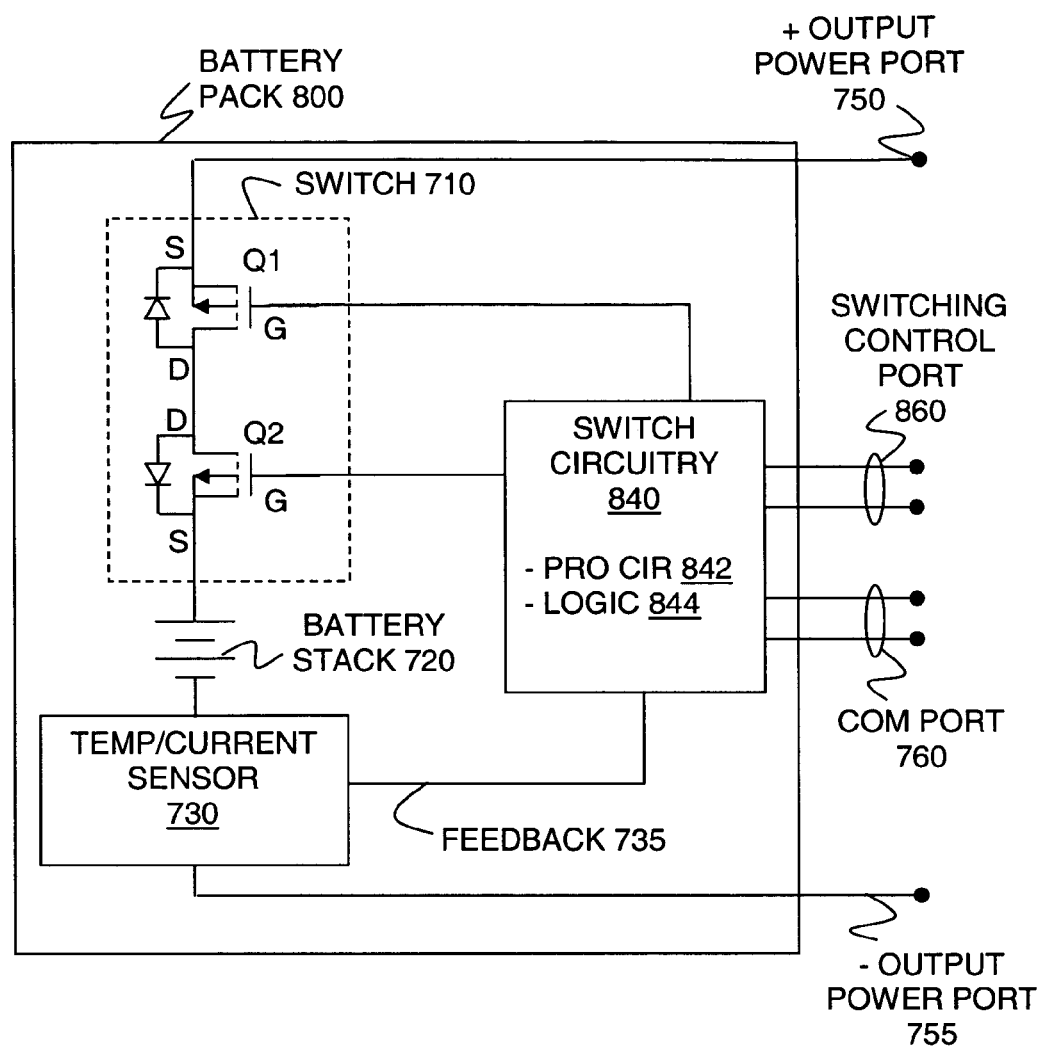
FIG. 8 illustrates one embodiment of a novel battery pack configuration.

FIG. 8 illustrates one embodiment of the novel battery pack configuration 800. Many of the components can be the same as those in FIG. 7 with the exception of the switch circuitry 840 and a switching control port 860 in addition to, or in place of, the communications port 760. Control signals for switch 710 can be received over port 860. Switch circuitry 840 includes switching logic 844 that can couple and decouple the battery stack using switch 710 based on the switching control signals.

In other words, embodiments of the novel battery pack configuration can take advantage of many of the components found in typical battery packs to perform the switching functions that are often performed in the power systems of electronic devices. By moving the switching functions to the battery pack itself, the power systems can be substantially simplified. For example, a comparison of FIG. 1 and FIG. 6 shows that both the charging selector 130 and source selector 160 can be removed from the power system, while adding relatively little circuitry to the battery pack.

In addition to switching logic 844, the illustrated embodiment includes protection circuitry 842 that can perform functions similar to those of battery controller 740 from FIG. 7. That is, protection circuitry 842 can open switch 710 based on feedback 735 from sensor 730, as well as potentially communicate with an external system over communications port 760. Some embodiments may include a single port for both switching control signals and other external communications.

Figure 9:
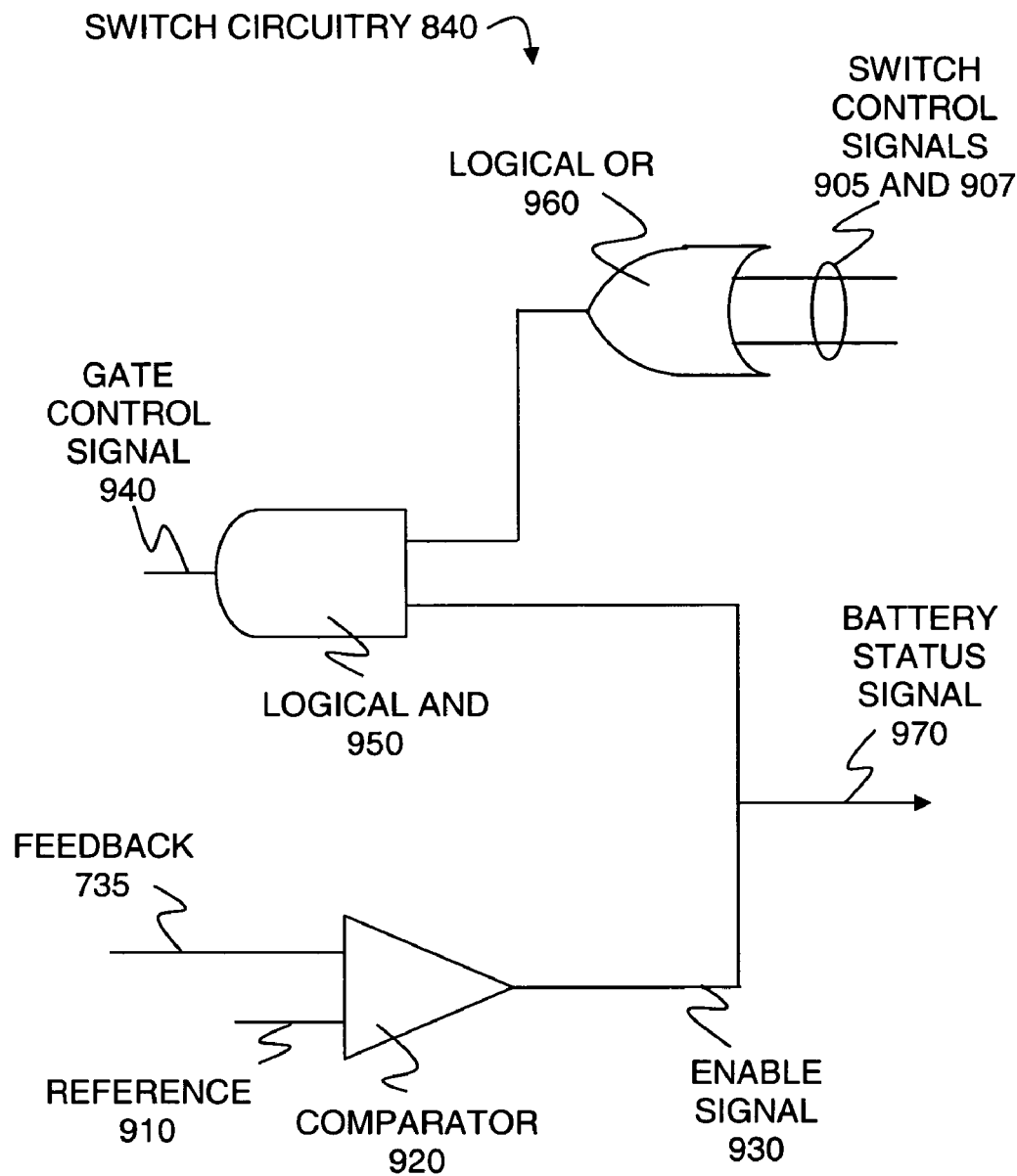
FIG. 9 illustrates one embodiment of switch circuitry.

Switch circuitry 840 may include any of a number of circuits to perform a wide variety of functions. FIG. 9 illustrates just one embodiment of what might be included in switch circuitry 840. In the illustrated embodiment, feedback signal 735 from the sensor 730 is supplied to a comparator 920 and compared to a reference 910. For example, reference 910 may be a minimum current level at which the battery stack can safely be used. If feedback 735 is above this minimum safe bound, comparator 920 may set enable signal 930 high. If feedback 735 drops below the minimum safe bound, comparator 920 may set enable signal 930 low. Switch circuitry 840 may include additional circuitry to similarly test for a maximum safe current level, a maximum safe temperature, etc.

The enable signal 930 may be provided to an external system in the form of a battery status signal 970. In other embodiments, the battery status signal may be based on a combination of signals. For example, if the maximum current level and maximum temperature are also monitored as mentioned above, the status signal may be a logical AND of all three enable signals.

Referring back to FIG. 9, enable signal 930 is provided to logical AND 950. The other input of AND 950 is coupled to receive a control signal for switching the battery pack's switch. For example, in the illustrated embodiment, the battery pack receives two switch control signals 905 and 907. In a typical power system, such as the system of FIG. 1, when signal 905 is high it may indicate that a charging selector is supposed to recharge the battery pack, and when signal 907 is high it may indicate that a source selector is supposed to power the power rail with the battery pack. Signals 905 and 907 may be, for instance, generated by an operating system.

In the illustrated embodiment, signals 905 and 907 are supplied to the battery pack rather than a charging selector and a source selector. In the battery pack, the signals are combined by logical OR 960. If either signal is high, the output of OR 960 will be high, indicating that the system requests the battery stack to be coupled to the power rail. In other words, the illustrated battery pack can be used with an existing operating system, without changing how the control signals are generated.

In other embodiments, the control signals may be combined outside the battery pack. For instance OR 960 could be located somewhere within a power system rather than in the battery pack, or the signals could be combined in software.

AND 950 combines the enable signal 930 with the output from OR 960 to generate a gate control signal 940 for switch 710. When the gate control signal 940 is high, gate 710 can close and couple the battery stack to the power output ports. The enable signal 930 acts as a priority fail-safe. That is, if the enable signal goes low, the output of AND 950 will stay low no matter what happens on the switching control signals.

Figure 10:
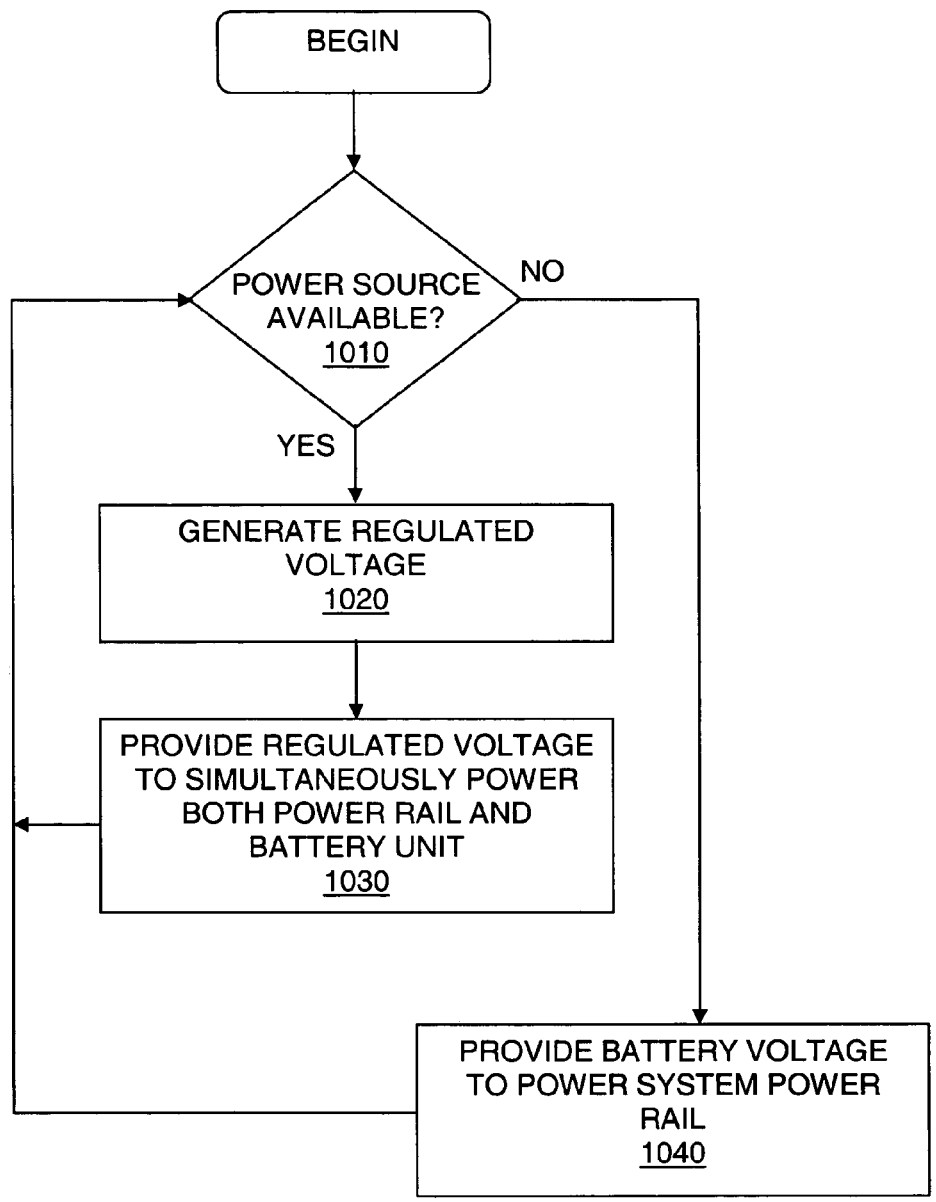
FIG. 10 demonstrates one embodiment of a novel power system configuration.

FIG. 10 demonstrates a process for one embodiment of the novel power system configuration. At 1010, the process monitors changes in an external power source. If an external power source becomes unavailable, the process provides a battery voltage to the power rail at 1040. This could involve, for instance, generating appropriate control signals for a source selector or a battery pack switch. It may also involve selecting from among a combination of one or more available batteries.

If an external power source becomes available at 1010, the process generates a regulated voltage at 1020. Then, at 1030, the process provides the regulated voltage to simultaneously power both a battery unit and the power rail. Powering the battery unit may involve determining if one or more batteries need to be recharged, generating appropriate control signals to select a battery for recharging, and then recharging the selected battery. Any number of approaches can be used to prioritize among one or more batteries and to generate the appropriate control signals.

Figure 11:
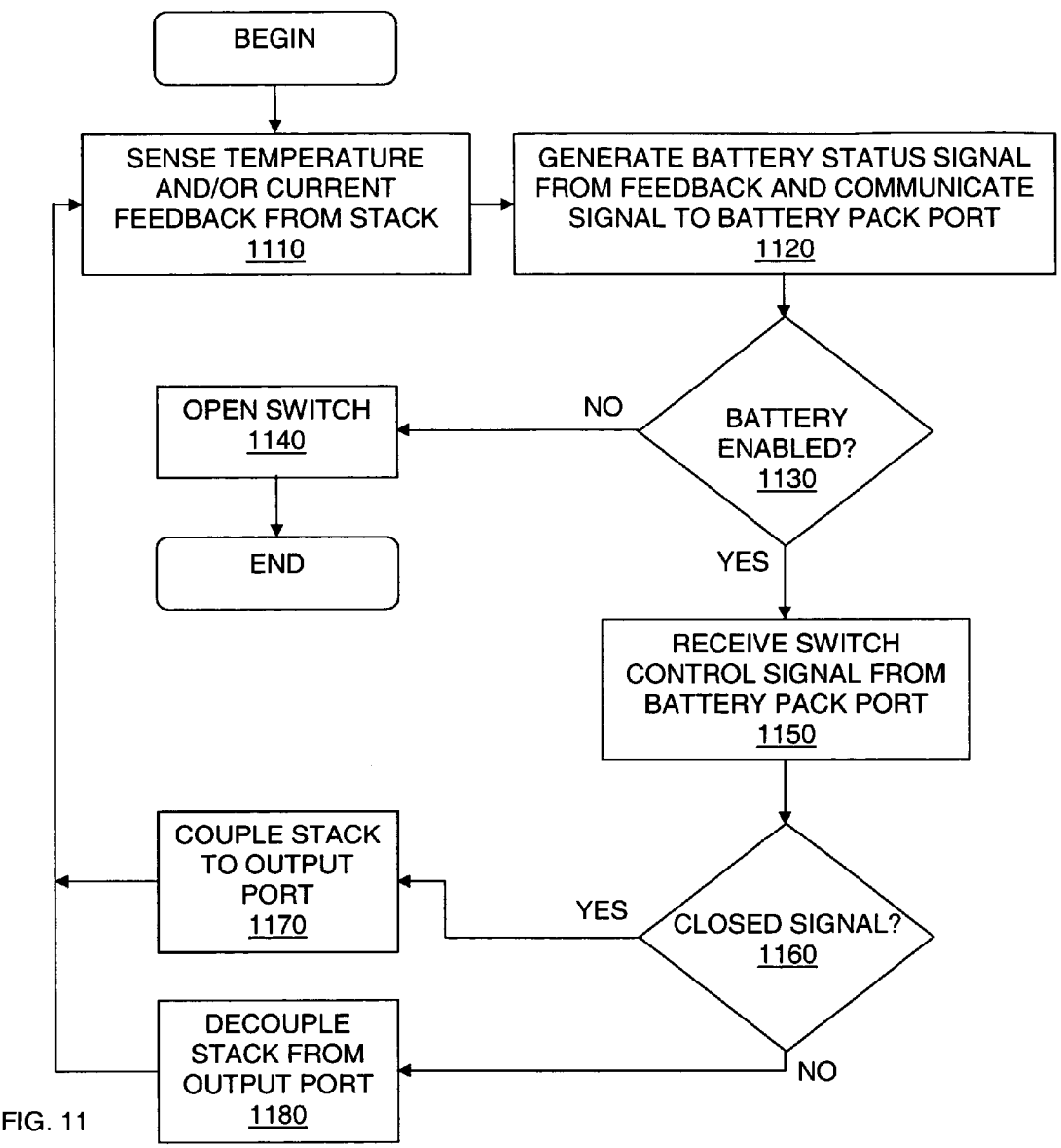
FIG. 11 demonstrates one embodiment of a novel battery pack configuration.

FIG. 11 demonstrates a process for one embodiment of the novel battery pack configuration. At 1110, the process senses temperature and/or current feedback from a battery stack. At 1120, the process generates a battery status signal based on the feedback and communicates that status signal to the battery pack port.

The battery status signal is also used internally by the battery pack at 1130 to determine if the battery should be disabled. If the battery should be disabled, the process opens the switch in the battery pack at 1140 and then ends. In some embodiments, a battery stack may be permanently disabled in this way. In other embodiments, a battery stack may recover, possibly depending on the type of event that disabled the battery stack.

If the status signal does not disable the battery stack at 1130, the process receives a switch control signal from the battery pack port at 1150, and considers the switch control signal at 1160. If the signal indicates that the switch should be closed, the process couples the stack to the output port at 1170. With the switch closed, the battery pack can either be recharged by the power rail or supply power to the power rail. On the other hand, if the signal indicates that the switch should be open at 1160, the process decouples the stack at 1180. In either case, the process then returns to 1110 to start over.

FIGS. 2-6 and 8-11 illustrate a number of implementation-specific details. Other embodiments may not include all of the illustrated elements, may include additional elements, may arrange elements in a different order, may combine one or more elements, and the like. For example, other battery pack embodiments may not include communications port 760, or may combine the functions of communications port 760 and switching control port 860 into a signal port. Each port in the Figures may take any of a variety of forms. For instance, each port may comprise one or more pins, contacts, sockets, etc. Furthermore, any of a number of alternate hardware circuits can be used to perform the various functions described above. Or, one or more of the functions described above may be performed by code executed in a processor.

Figure 12:
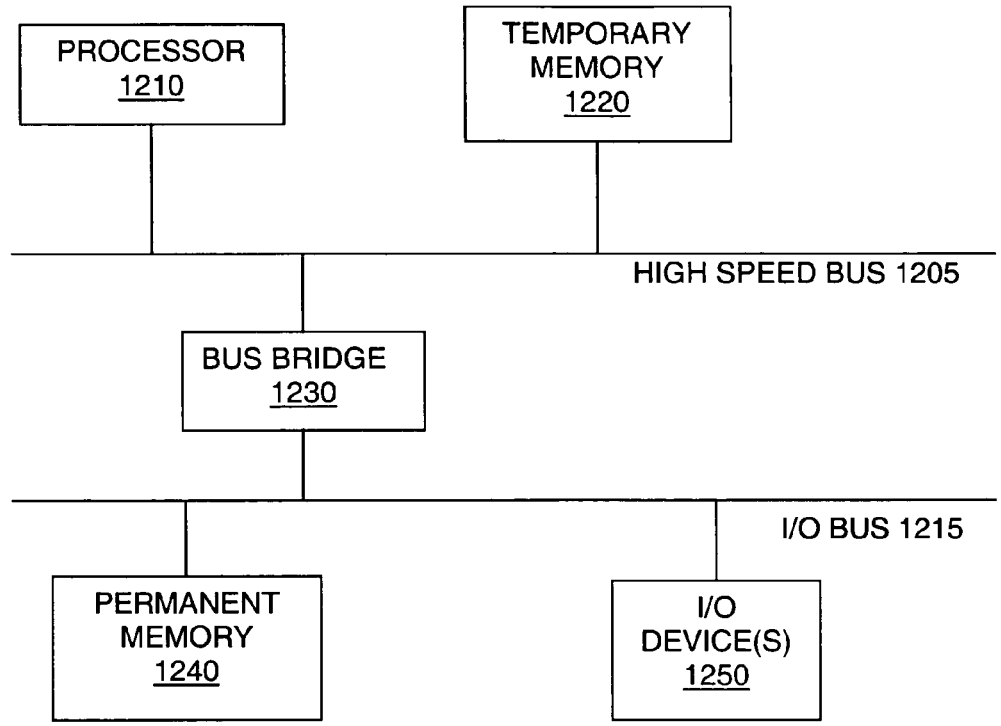
FIG. 12 illustrates one embodiment of a hardware system that can perform various functions of the present inventions.

For example, FIG. 12 illustrates one embodiment of a generic hardware system intended to represent a broad category of computer systems such as personal computers, workstations, and/or embedded systems. In the illustrated embodiment, the hardware system includes processor 1210 coupled to high speed bus 1205, which is coupled to input/output (I/O) bus 1215 through bus bridge 1230. Temporary memory 1220 is coupled to bus 1205. Permanent memory 1240 is coupled to bus 1215. I/O device(s) 1250 is also coupled to bus 1215. I/O device(s) 1250 may include a display device, a keyboard, one or more external network interfaces, etc.

Certain embodiments may include additional components, may not require all of the above components, or may combine one or more components. For instance, temporary memory 1220 may be on-chip with processor 1210. Alternately, permanent memory 1240 may be eliminated and temporary memory 1220 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

In one embodiment, various functions of the present invention, as described above, could be implemented using one or more hardware systems such as the hardware system of FIG. 12. Where more than one computer is used, the systems can be coupled to communicate over an external network, such as a local area network (LAN), an internet protocol (IP) network, etc. In one embodiment, one or more functions of the present invention as described above may be implemented as software routines executed by one or more execution units within the computer(s). For a given computer, the software routines can be stored on a storage device, such as permanent memory 1240.

Figure 13:
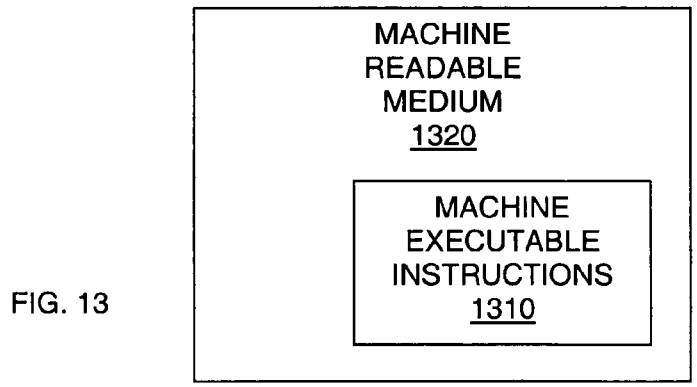
FIG. 13 illustrates one embodiment of a machine readable medium to store instructions that can implement various functions of the present inventions.

Alternately, as shown in FIG. 13, the software routines can be machine executable instructions 1310 stored using any machine readable storage medium 1320, such as a hard drive, a diskette, CD-ROM, magnetic tape, digital video or versatile disk (DVD), laser disk, ROM, Flash memory, etc. The series of instructions need not be stored locally, and could be received from a remote storage device, such as a server on a network, a CD-ROM device, a floppy disk, etc., through, for instance, I/O device(s) 1250 of FIG. 12.

From whatever source, the instructions may be copied from the storage device into temporary memory 1220 and then accessed and executed by processor 1210. In one implementation, these software routines are written in the C programming language. It is to be appreciated, however, that these routines may be implemented in any of a wide variety of programming languages.

In alternate embodiments, the embodiments of the present invention described above may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a novel power system configuration and a novel battery pack configuration are described. Whereas many alterations and modifications of the present invention will be comprehended by a person skilled in the art after having read the foregoing description, it is to be understood that the particular embodiments shown and described by way of illustration are in no way intended to be considered limiting.

Therefore, references to details of particular embodiments are not intended to limit the scope of the claims.

What is claimed is:

1. An apparatus comprising:
   an input power port;
   a power rail;
   a battery unit, wherein the battery unit includes a battery pack port to receive a battery pack; and
   a system charger voltage regulator (VR) to couple the input power port to the battery unit, and said battery unit to couple with the system charger VR and the power rail,
   wherein the power rail extends beyond the battery unit to couple the system charger VR to the battery unit, and
   wherein the battery pack comprises:
   a switch control port to receive a switch control signal from the battery pack port;
   a battery stack; and
   a switch to selectively couple the battery stack to the battery pack port based at least in part on the switch control signal.

2. A system comprising:
   a mobile computer; and
   a power apparatus for the mobile computer, said power apparatus comprising
   an input power port;
   a power rail;
   a battery unit, wherein the battery unit includes a battery pack port to receive a battery pack; and
   a system charger voltage regulator (VR) to couple the input power port to the battery unit, and said battery unit to couple with the system charger VR and the power rail,
   wherein the power rail extends beyond the battery unit to couple the system charger VR to the battery unit, and
   wherein the battery pack comprises:
   a switch control port to receive a switch control signal from the battery pack port;
   a battery stack; and
   a switch to selectively couple the battery stack to the battery pack port based at least in part on the switch control signal.

* * * * *